No. 629,584. Patented July 25, 1899.
R. D. MERSHON.
STATION POTENTIAL INDICATOR.
(Application filed Feb. 1, 1899.)
(No Model.)
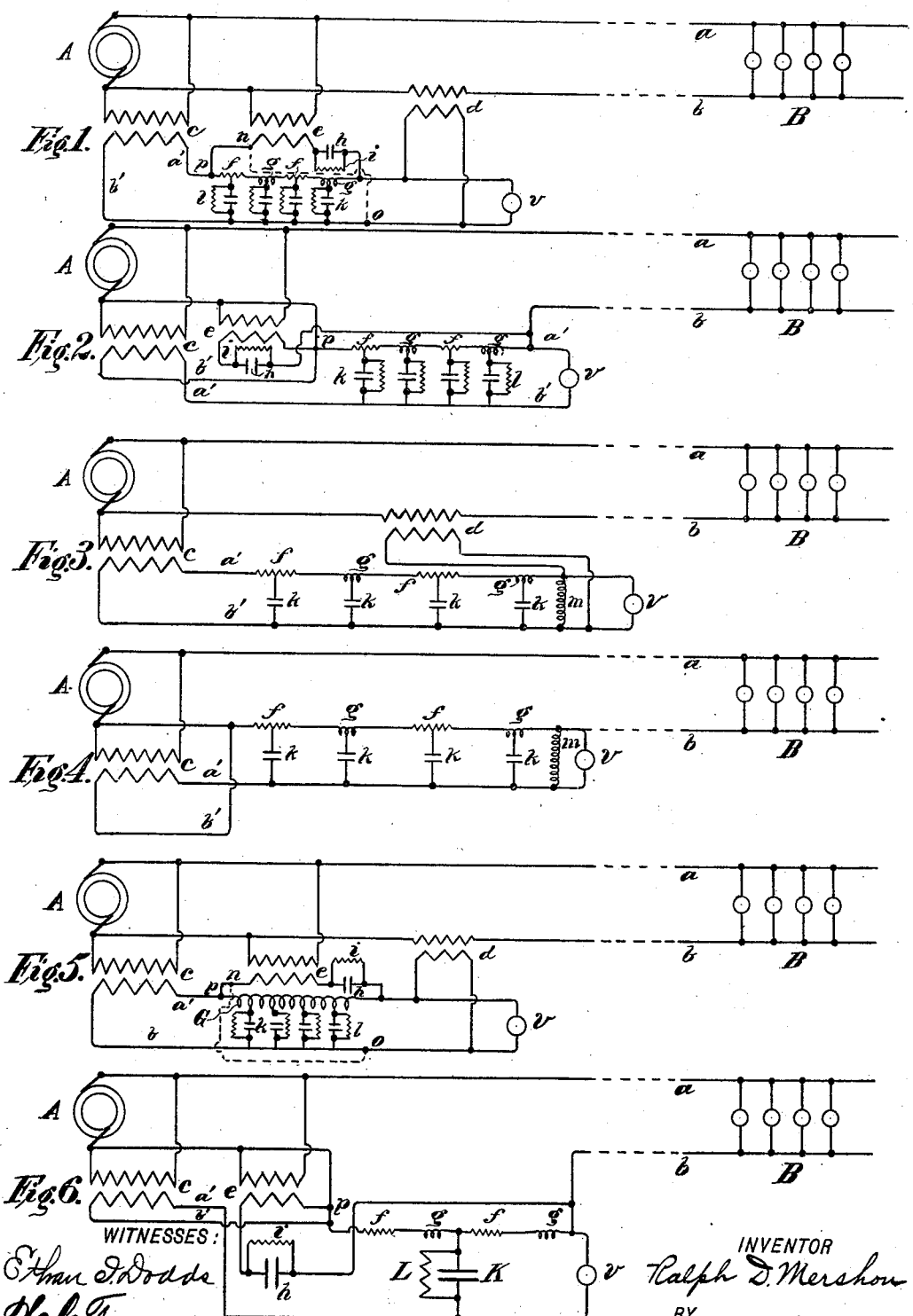

UNITED STATES PATENT OFFICE.

RALPH D. MERSHON, OF NEW YORK, N. Y., ASSIGNOR TO THE WESTING-HOUSE ELECTRIC AND MANUFACTURING COMPANY, OF PENNSYLVANIA.

STATION POTENTIAL-INDICATOR.

SPECIFICATION forming part of Letters Patent No. 629,584, dated July 25, 1899.

Application filed February 1, 1899. Serial No. 704,162. (No model.)

*To all whom it may concern:*

Be it known that I, RALPH D. MERSHON, a citizen of the United States, residing in New York, in the county and State of New York, have invented a new and useful Improvement in Station Potential-Indicators, (Case No. 798,) of which the following is a specification.

My invention relates to systems of distribution for alternating electric currents, and more particularly to means employed for indicating at the generating-station or other desired point the potential at the load in such systems.

The object of my invention is to provide a method and a means whereby the potential at the load may be substantially indicated at the power-station or at any other desired point whatever may be the ohmic or inductive drop in the line or other disturbing effect or effects tending to vary the potential at the load from that at the generator end of the line.

In Patent No. 551,982, granted to me December 24, 1895, and in Patent No. 571,839, granted to me November 24, 1896, I have described and claimed methods and means whereby the potential at the load in an alternating-current circuit may be either exactly or approximately indicated where there is either an inductive or ohmic drop in the line or where both the ohmic and inductive resistance of the line cause a variation between the effective potential at the load and that at the generator or power station.

As is set forth in each of my patents above referred to, there are many possible arrangements of circuits and connections for securing an accurate indication of the potential at the load.

The patented systems give substantially correct results when used in connection with transmission-lines delivering all of the power to a more or less definite and limited location on the line; but where the conditions are such that the power or current taken from the line instead of being taken at one definite place is distributed at various places along the line the method and means above referred to will not give accurate indications. The condition last mentioned is present in long transmission-lines where there is more or less current due to, first, capacity effects; second, to loss between wires through the air and over insulators, and, third, where power is delivered at various points along the line.

For convenience of description I shall hereinafter refer to the first of the effects above enumerated as "line capacity," to the second as "line leakage," and to the third as "distributed load."

The conditions of line capacity and line leakage exist in all transmission-lines, and though they are not ordinarily of sufficient prominence to be noticeable or to affect the working of the system they may assume such prominence in long transmission-lines carrying high voltages or in short transmission-lines where there exist what would be ordinarily considered abnormal conditions.

By employing a suitable combination of apparatus it is possible to indicate at any desired point the voltage existing at any other desired point of the line when the three specified conditions or any one or two of them are present, provided that where there is distributed load—*i. e.*, a load located at two or more different points in the line—the power taken at the several distributed points is constant at each point. If the power is not constant, the indication will be approximate only, whereas if line capacity and line leakage exist without distributed load the indication secured may be substantially accurate.

I will first describe the method that I have devised for indicating the voltage when either line capacity or line leakage, or both, exist and the third condition of distributed load is not present. In describing this method I will first assume that the indicating means is located at the power-station and that the point the voltage of which it is desired to indicate is at approximately the end of the line, where I will also assume that the power is delivered.

In the accompanying drawings, Figures 1, 2, 3, 4, 5, and 6 are diagrams of circuits and apparatus adapted for practicing my invention, a separate and detailed description of each of which will be more conveniently given in connection with the detailed description of the structure and operation of the invention.

The figures of the drawings correspond for the most part to the figures in my patents hereinbefore mentioned, the changes and additions being only such as are necessary for the performance of the functions entailed by the new conditions imposed.

In each of the figures the generator A supplies the transmission-circuit $a\ b$ with electrical energy to be utilized by translating devices B, located at a more or less distant point. This load B may comprise any kind of electrical translating devices or a variety of such devices connected in any known way to the circuit, either directly or by means of step-down transformers. It will also be understood, of course, that a step-up transformer may be used between the main generator and the transmission-line where the distance of transmission is so great that the generator voltage is not sufficiently high for the purpose.

In each of the figures of the drawings the primary of a transformer $c$ is connected across the main circuit $a\ b$ at or near the generator A, and the secondary of this transformer is included in a local circuit $a'\ b'$ in order to impress upon the local circuit an electromotive force that is representative of the main-line impressed electromotive force. In each figure the local circuit $a'\ b'$ also contains other devices and apparatus so constructed and arranged as to insure the production in such local circuit of the conditions corresponding to those of the main line in order that the voltmeter $v$, also included in each local circuit, shall correctly indicate the line voltage at the load. The details of construction other than those above specified vary in the different figures and will be considered separately.

Referring now particularly to Figs. 1 and 2, which illustrate the means employed for indicating the voltage when line capacity and line leakage both exist to such a degree as to make it necessary or desirable that they be taken into account, the reactance-coil and non-inductive resistance employed in my former patents to represent the inductive and ohmic resistance of the line are here subdivided, and the subdivisions $g$ of the reactance-coil are made to alternate in the local circuit with the divisions $f$ of the ohmic resistance. Connected between the middle point of each ohmic-resistance division $f$ and each reactance-coil division $g$ and the opposite side of the local circuit in parallel are a condenser $k$ and a resistance $l$ of suitable capacity. The resistance $l$ may be either reactive or ohmic, or a combination of the two, as may be required in any particular case. It will be seen that the subdivisions $g$ of the reactive coil and subdivisions $f$ of the ohmic resistance, in combination with the condensers $k$ and the resistances $l$, represent in miniature the reactance, resistance, distributed capacity, and distributed loss between the wires in the main or transmission line and that this resemblance may be carried to any desired degree of accuracy by sufficiently subdividing the reactance-coil and the resistance and at the same time suitably subdividing the capacity devices or condensers. It will also be understood that the reactance and ohmic-resistance elements may be combined as a single element having both reactance and resistance and that the condensers and resistance in parallel therewith may be attached at various points along this combined element, as is indicated, for example, in Fig. 5 of the drawings, this figure being in all respects like Fig. 1, except that the ohmic and inductive resistances in the local circuit have been combined into a single element G. It will also be understood that if the ohmic and inductive resistance be combined in this manner or if they be sufficiently subdivided and the subdivisions alternated, as indicated in Figs. 1 and 2, a single condenser of suitable capacity and a single resistance of proper construction and proportions may be attached at the proper point and employed in lieu of the plurality of small condensers and resistances shown in Figs. 1 and 2. This modification is illustrated in Fig. 6 of the drawings, this figure being a reproduction of Fig. 2, except that a single condenser K and a single resistance L are employed in lieu of the plurality of these devices, as in Figs. 1 and 2.

In each of Figs. 1, 3, and 5 the representation in the local circuit of the main-line current is effected by means of a converter $d$, while in each of Figs. 2, 4, and 6 this result is effected by connecting the local circuit directly to the main line.

The values of the capacity or condenser elements and of the resistances in parallel therewith will of course depend upon and be fixed by the capacity of the line and the loss between the line-wires, &c.; but the combination thus far described will not accomplish the desired end for the reason that there is already passing through the miniature reactance and resistance a current proportional to and in step with that component of the line-current which is due to distributed capacity and loss between the wires—that is, line capacity and line leakage. Consequently the effect of this current on the reactances and resistances must be neutralized. This is accomplished by means of a converter $e$, which includes in its secondary circuit a suitable condenser or capacity device $h$ and a suitable resistance $i$, the two being in parallel with each other and in series with the resistances $f$ and reactances $g$. The connections are also such that the current through the reactances $g$ and resistances $f$ due to the converter $e$ is in the reverse direction to that component of the current originally flowing through the reactances and resistances by reason of the existence of the line capacity and line leakage.

In Figs. 1 and 2 the effects of line capacity and line leakage are represented as distributed instead of as concentrated at the end of the line, the former being the condition which exists in the transmission-circuit.

It is apparent that if line capacity only of the three disturbing elements hereinbefore mentioned exists then the resistances $l$ may be omitted and the condensers $k$ only may be used. If line leakage only exists, then the condensers may be omitted and the resistances only may be used.

When, in addition to neutralizing the line-current component in the reactances and resistances, it is necessary to neutralize it in the converter $c$, the connection of converter $e$ instead of being made at the point $p$ should be made at the point $o$, so that the current from the converter $e$ shall pass through converter $c$. This connection for the conditions last mentioned I have indicated by broken line $n\ o$ in Figs. 1 and 5.

Converters $c$ and $e$ may be combined in one piece of apparatus if properly designed, one of the conditions of such design being the employment of two secondary windings corresponding, respectively, to the secondaries of converters $c$ and $e$, as shown in the drawings.

Reference may now be had to Figs. 3 and 4, which show another method of and means for accomplishing the end desired—that is, the correct indication of the potential at the load in the main circuit when line capacity but not line leakage is present in the main circuit. In this case the neutralization instead of being effected by means of converter $e$ is effected by means of a reactance-coil $m$ so adjusted that its current is equal to that which would exist in the reactances $g$ and resistances $f$ if such coil were not connected. Since a reactance-coil takes a current displaced one hundred and eighty degrees from that of a condenser and since the component of current which it is desired to neutralize is a capacity-current, a proper adjustment of the reactance-coil $m$ will accomplish the desired purpose.

The statement made above as to the angular displacement between the current taken by a reactance-coil and one taken by a condenser is made upon the assumption that the condenser and reactance-coil are theoretically perfect in operation—that is, such as have no loss. Since by assumption the condenser has no loss and since the condition of no loss can be very closely approximated in a reactance-coil of suitable design, the statement holds good in this case and in practice can be made to hold good with a sufficiently-close approximation for practical purposes.

The arrangement of apparatus shown in Figs. 3 and 4 is open to the objection that if the coil $m$ is properly adjusted for one frequency it will not be for another. Hence if the speed of the generator changes materially the voltmeter will not give a correct indication. However, where fairly good speed regulation obtains the error due to this cause will be small.

We will now consider the question of obtaining proper indication when the load is distributed at various points along the transmission-line.

It is evident that if the component of current due to distributed load is constant the distributed load may be represented similarly to the representation of line leakage in Figs. 1 and 2 by the resistances $i$ and $l$. As the resistance $l$ represents a distributed cause, it is subdivided in order to approximate the condition of such distribution. If the line-load is not distributed, the resistance $l$ must be located in the local circuit at such a point as corresponds to the actual location of the load on the working line, and a suitably-designed shunt must be provided for the resistance $i$. If the distributed load, and therefore the current due to it, are not constant, then an approximate indication may be obtained by representing such load by a resistance or by resistances properly located and taking the current the value of which is proportional to the average value of the component of current due to the distributed load.

It is of course to be understood that when the distributed load is represented by a combination similar to resistances $l$ the combination must be such as to take a current proportional to and in step with that taken by the distributed load. This can be accomplished by making the representative of such load a suitable combination of resistance, reactance, and, if necessary, capacity.

If line capacity, line leakage, and distributed load do not all exist in the line, but only one or two of them, those elements corresponding to the cause or causes not present may be obviously omitted.

Throughout the foregoing description the term "resistance" as applied to the element $l$ has been used rather loosely. While the term "resistance" is ordinarily construed to mean ohmic resistance or dead resistance when used without qualification, the resistance $l$ may be either reactive or ohmic or a combination of the two.

As an example of the value of my present invention where the load is not all located at any one point—say at the end of the transmission-line—let us suppose that we have a line in which capacity and leakage both exist and that the main load located at the end of the line is one for which special regulation is not necessary—that is, it can stand a considerable variation in voltage. At another point—say midway between the generator and the main load—is a group of translating devices—such, for example, as electric lights—which require good regulation and which constitute what has been heretofore designated as the "distributed load." Then the load at approximately the middle of the line will be represented at the generating-station by a resistance which takes a current proportional to and in step with the average current at such load and which is located half-way along the combination of reactance and resistance—that is, the miniature reactance and resistance in the local circuit. Since the lighting-load is half-way along the transmission-line—that is, half-way between the generator and the main load—the voltmeter connected half-way along the combination of reactance and resistance will approximately indicate the voltage at such midway load, and if the main load is large with reference to this midway load the indication may be quite accurate. Indeed, if the main load be very large with respect to the lighting-load the representation of the latter in the local circuit may be omitted and the voltmeter attached half-way along the combination of miniature reactance and resistance.

When the effect of capacity-current in the generating-station is neutralized by a reactance-coil connected across the main line beyond the miniature local circuit or by raising transformers beyond the miniature local circuit, which take a large magnetizing-current, as may be done, it is evident that the converter $e$, with its resistance $i$ and condenser $h$, may be omitted from the circuit shown in Figs. 1 and 2.

While I have for convenience assumed that the potential-indicating apparatus is located at the main generating or power station, as will usually be found desirable in practice, I desire it to be understood that the said apparatus may be located at any other desired or convenient point in the line.

Modifications of apparatus and circuits other than those specifically illustrated and described may be made without departing from my invention, and I therefore desire it to be understood that the invention is not intended to be circumscribed by the specific disclosure hereinbefore made.

I claim as my invention—

1. A station potential-indicator for alternating-current circuits having line capacity, line leakage or distributed load, or two or more of said conditions, comprising a local circuit having means for approximately reproducing in miniature the impressed and counter electromotive forces of the main circuit and such of said line conditions as may exist, and means for indicating the value of the resultant electromotive force.

2. Means for indicating at any point the potential at any other point in an alternating-current circuit having line capacity, line leakage or distributed load or a plurality of said conditions comprising a local circuit in which the impressed and counter electromotive forces of the main circuit are approximately reproduced in miniature, means for neutralizing in the local circuit the current due to line capacity, line leakage and distributed load or any of them, means for reproducing in miniature the said condition or conditions and means for indicating the resultant electromotive force.

3. The combination with an alternating-current circuit having line capacity, line leakage or distributed load or a plurality of such conditions, of a local circuit in which are represented the resistance and self-induction and such of the aforesaid conditions as are present in the main line and having a current proportional to and in step with the main current, connections between the local and main circuits whereby the electromotive force impressed upon the former may be proportional to and in step with that impressed upon the latter, and a voltmeter for indicating the resultant electromotive force.

4. Potential-indicating apparatus for alternating-current systems of distribution comprising means for approximately reproducing locally in miniature the main-line impressed and counter electromotive forces and the line capacity, leakage and distributed load, or such of the latter as exist and a device for indicating the resultant electromotive force.

5. The method of indicating at any point the potential at any other point in an alternating-current circuit which consists in producing two electromotive forces respectively proportional to and in step with the impressed and counter electromotive forces of the line and conditions corresponding to the line capacity, leakage and distributed load or to such of these as may exist, compounding the electromotive forces and indicating the value of the resultant electromotive force.

6. The method of determining at any point the potential at any other point in an alternating-current circuit which consists in producing in a local circuit electromotive forces proportional to the impressed and counter electromotive forces of the main circuit, neutralizing the current in said local circuit due to line capacity or leakage, or both, producing conditions corresponding to the main line, capacity, leakage and distribution of load or any of such conditions that may exist and indicating the value of the resultant electromotive force.

In testimony whereof I have hereunto subscribed my name this 24th day of January, 1899.

RALPH D. MERSHON.

Witnesses:
CHARLES A. TERRY,
L. C. CARUANA.